June 14, 1938.  V. S. KUCKI  2,120,412
MEASURING DEVICE
Filed Feb. 10, 1937   2 Sheets-Sheet 1

Inventor
Vincent S. Kucki

June 14, 1938. V. S. KUCKI 2,120,412
MEASURING DEVICE
Filed Feb. 10, 1937 2 Sheets-Sheet 2
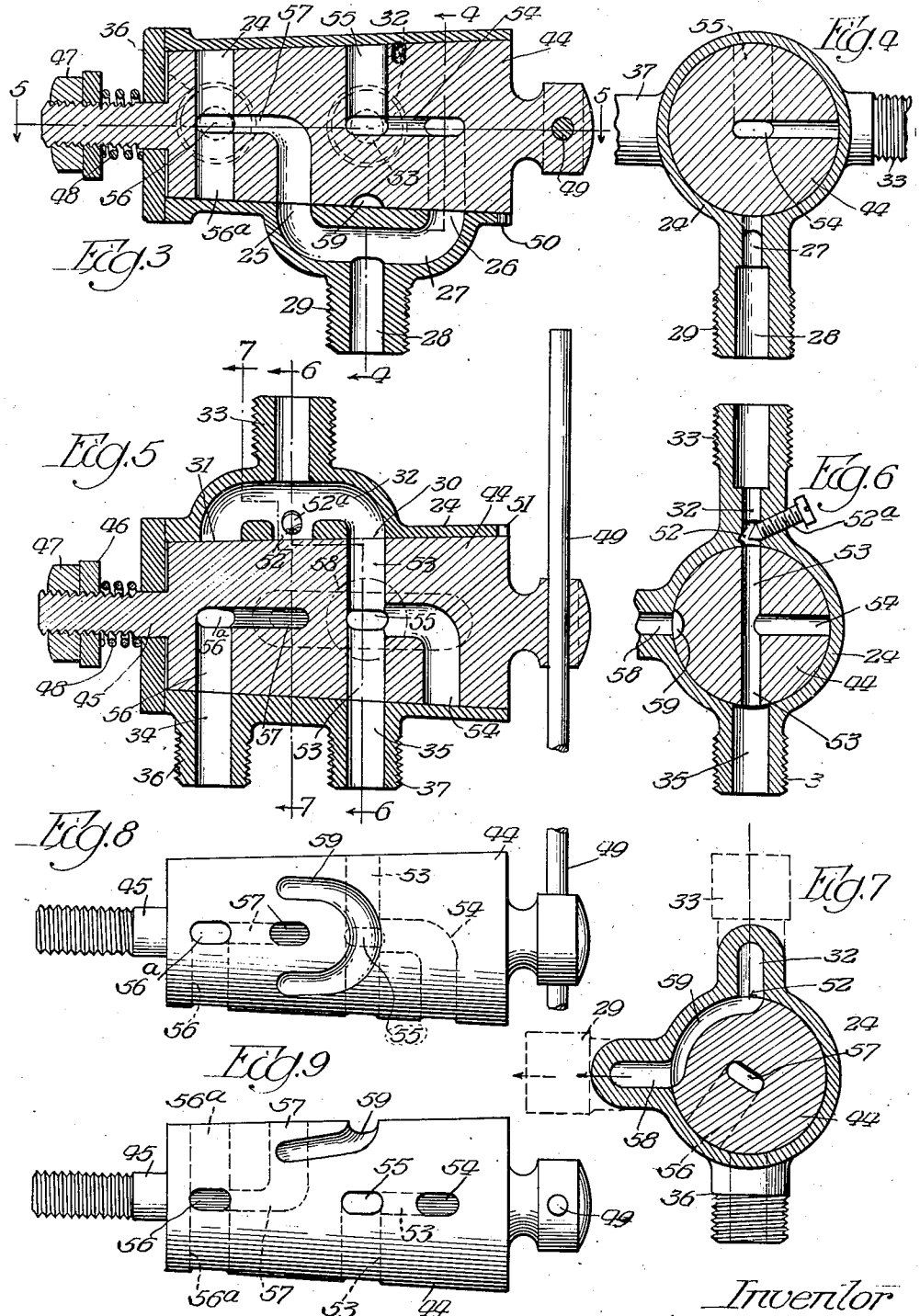
Inventor
Vincent S. Kucki Patented June 14, 1938

2,120,412

UNITED STATES PATENT OFFICE 2,120,412

MEASURING DEVICE

Vincent S. Kucki, Chicago, Ill.

Application February 10, 1937, Serial No. 124,992

9 Claims. (Cl. 221—102)

This invention relates in general to metering devices but more particularly to devices for measuring or dispensing predetermined quantities of liquids, and one of the objects of the invention is to provide an improved device of this character which is of a simple, durable and comparatively cheap construction, effective, accurate and efficient in operation.

A further object is to provide in conjunction with a measuring device of this character, a valve structure for controlling the delivery of the liquid into and discharge of the same therefrom, the said valve being adapted to entirely cut off the supply of liquid to the measuring mechanism, and at the same time divert the liquid from the supply to prevent the same from entering the measuring device and cause it to be delivered through a discharge outlet to the desired dispensing point.

To the attainment of these ends and the accomplishment of other new and useful objects as will appear, the invention consists in the features of novelty in substantially the construction, combination and arrangement of the several parts, hereinafter more fully described and claimed and shown in the accompanying drawings illustrating this invention, and in which Figure 1 is a view in elevation of a device of this character constructed in accordance with the principles of this invention.

Figure 3 is a detail sectional view taken on line 3—3 Figure 1, on an enlarged scale.

Figure 4 is a sectional view taken on line 4—4 Figure 3.

Figure 5 is a sectional view taken on line 5—5 Figure 3.

Figure 6 is a sectional view taken on line 6—6 Figure 5.

Figure 7 is a sectional view taken on line 7—7 Figure 5.

Figures 8 and 9 are views in elevation of the valve member.

Figures 1, 2:
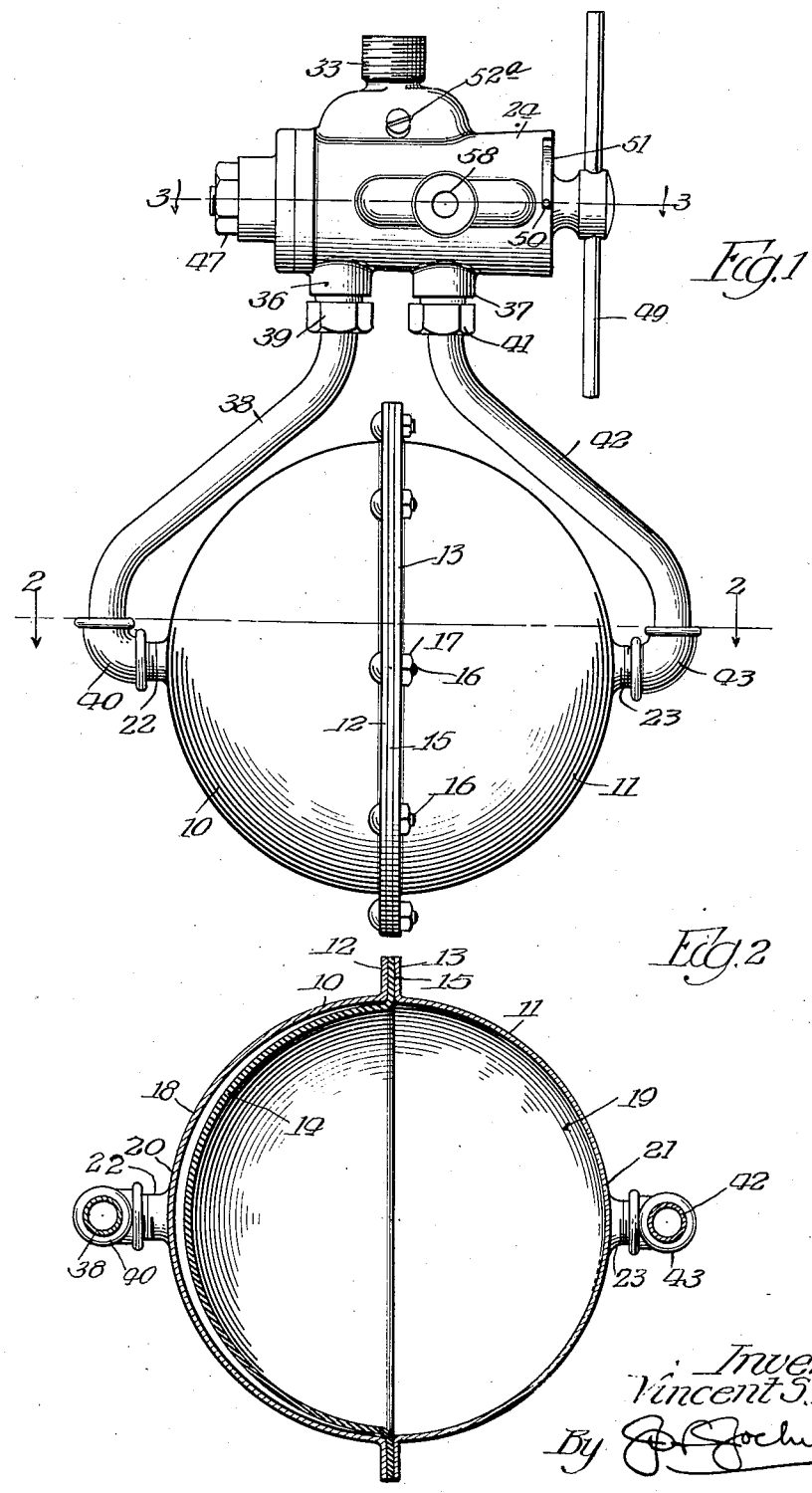
Figure 2 is a detail sectional view taken on line 2—2 Figure 1.

In the present exemplification of the invention the measuring device consists essentially of a chamber constructed of any suitable material and of any desired size and configuration and is preferably formed of two hollow members 10 and 11 having open sides and the open sides are disposed adjacent each other, the members being respectively provided with circumferential flanges 12 and 13.

The numeral 14 designates a flexible member constructed of any suitable material and is of a diameter considerably greater than the internal diameter of the chamber.

The peripheral edge 15 of the member 14 is disposed between the flanges 12 and 13 and the parts are secured together by means of bolts 16 passing through the flanges and the edge of the member 14 and on which bolts are threaded nuts 17. The member 14 conforms to the cross-sectional configuration of the chamber formed by the members 10 and 11 and is of such a size that it may be deflected into the respective members 10 and 11 to stand in close proximity to the adjacent face of the members.

It will be manifest that this member 14 which is in the nature of a diaphragm divides the chamber, comprised by the members 10 and 11 into two compartments 18 and 19, and each of the compartments is provided in its wall respectively with an opening 20 and 21 that serves as a combined inlet and outlet opening, and these openings may communicate with tubular extensions or pipes 22 and 23.

The numeral 24 designates a valve casing of any desired size and configuration and the casing is provided with openings 25 and 26 that communicate with a passage 27 which in turn merge and communicate with a common opening 28 in an extension 29 leading from the valve casing.

The casing is also provided with openings 30 and 31 in its wall that communicate with a passage 32 and in turn communicate with an opening in an extension 33 and the openings in the extensions 29 and 33 serve as inlet and discharge outlets for the valve casing.

The valve casing has also additional openings 34 and 35 which extend through projections 36 and 37 and to the projection 36 is connected a pipe 38 by means of a suitable coupling 39. The other end of the pipe is connected to the extension 22 on the member 10 of the measuring chamber in any suitable manner, such as by means of an elbow or coupling 40.

Connected also to the extension 37 of the valve casing 24 and by means of a suitable coupling 41 is a pipe 42 which in turn is connected by any suitable means such as an elbow or coupling 43 with the extension 23 on the member 11.

The valve proper 44 is seated in the casing 24 and may be held against displacement with respect to the casing in any suitable manner preferably by reducing the one extremity thereof as at 45 that projects through a portion 46 arranged at the end of the valve casing and is threaded to receive a nut 47. A coil spring 48 is disposed between the end of the valve 44 and the portion 46, and a handle 49 is provided for rotating the valve. The valve is provided with a pin or projection 50 that operates in a recessed portion 51 of the valve casing, the ends of the recess serving as stops to be engaged by the pin 50 to limit the rotation of the valve within the casing.

The valve casing 24 is provided with an additional port or opening 52 which preferably is disposed intermediate the openings 30 and 31 as shown more clearly in Figure 5.

In the valve there is provided a passage or port 53 that extends entirely across the valve and communicating with and leading from this port or passage 53 is another port or passage 54 which opens through the side of the valve, an additional port or passage 55 extends through the side of the valve and has communication with the port or passage 53. Another port or passage 56 extends entirely through the valve and is arranged preferably at substantially right angles to the port or passage 53 although these passages may be disposed in any suitable relation to each other.

This passage 57 in the valve 44 has communication with the passage 56 and opens through the side of the valve.

All of these passages are so arranged in respect to each other and with the various ports in the valve casing that when the valve 44 is in the position as shown in Figure 5 liquid entering the opening in the extension 33 will be delivered to the passage 32, thence through the opening 30 into the port or passage 53 and will flow through the passage 35 into the pipe 42 to be discharged into the compartment 19 on one side of the diaphragm 14, deflecting the latter to cause it to assume the position shown in Figure 2.

At the same time the port or passage 56 will have been moved into the position shown in Figure 5 to establish communication from the compartment 18 through the pipe 38, passage 34 in the valve casing, port or passage 56 in the valve, and the port or passage 57 which communicates with the discharge outlet 58 leading from the valve casing 24.

When the valve is in this position and if before the diaphragm 14 is deflected into the position shown in Figure 2, liquid was contained in the compartment 18 it will, by the deflection of the diaphragm, be forced therefrom.

As the chamber formed by the members 10 and 11 on each side of the diaphragm is adapted to contain a predetermined quantity of liquid, it will be manifest that by thus deflecting the diaphragm this predetermined quantity of liquid will have been measured and forced out of the compartment 18.

By then reversing the valve 44 or turning the same to the extent of its rotary movement permitted by the pin and recess 51, the ports and passages in the valve will be shifted with respect to the ports or passages in the valve casing and the liquid will then be directed into the compartment 18 to discharge from the compartment 19 the liquid which has accumulated in the latter during the discharge of the liquid from the compartment 18.

This is accomplished by turning the valve from the position shown in Figure 5 so that the passage 53 will be moved out of communication with the passage 35 and also the port 30, and the passage 56 will be moved out of communication with the passage 34. During this movement the passage 55 will be moved into communication with the passage 35 while the passage 54 leading from the passage 55 will be moved into communication with the outlet 58. The passage 56—A will also be moved into communication with the passage 31 and also with the passage 34, while the passage 57 will be moved out of communication with the discharge outlet 52 and the passage 56 will be moved out of communication with the passage 34, with the result that the liquid will flow from the inlet 33 into the passage 32 thence through the opening or port 31 through the passage 56—A into the port or passage 34 and thence through the pipe 38 into the compartment 18 on the other side of the diaphragm 14 to deflect the latter and thereby discharge or cause the liquid in the compartment 19 to flow through the discharge outlet 58.

Obviously this operation may be repeated as often as desired, with the result that the liquid will flow first into one compartment and then into the other and the delivery of the liquid into one of the compartments will discharge the liquid from the other compartment.

With the parts in this position the flow of the liquid will be reversed and instead of being directed into the compartment 19 will flow into the compartment 18 to force the partition or diaphragm into the compartment 19, and this will in turn force the liquid out of the compartment 19 through the discharge outlet 33.

Thus it will be seen that the flow of the liquid into and out of the compartments may be selectively controlled by the operation of the valve.

The inlet 33 is connected to the source of supply and when it is desired to dispense the liquid from the source of supply, without directing it into the measuring compartments, the measuring compartments can be cut off and the liquid by-passed so as to flow directly from the source of supply through the inlet 33 to the discharge outlet 58.

This is accomplished by providing a groove or channel 59 which is preferably provided in one portion of the face of the valve and is so shaped that when the other passages are cut off or closed, the groove or channel 59 will assume a position to provide a passage directly from an opening 52 in the wall of the passage 32 to the discharge outlet 58, as shown more clearly in Figure 7, so that the liquid therein from the passage 32 will be directed by the channel or passage 59 to the discharge outlet 58.

When the valve is set so as to cause the liquid to pass into and out of the measuring device, the liquid is therein under a predetermined pressure exerted upon the supply, but when it is desired to by-pass the liquid so that it will flow directly from the source of the supply to the discharge outlet of the valve casing, it is desirable, and in fact necessary, to dispense the liquid in this manner under a different pressure; that is, the pressure during this operation should be reduced.

This may be accomplished in any suitable manner but preferably by restricting the passage 52 (see particularlly Figure 5) with which the groove or channel 59 communicates.

A simple and efficient means for accomplishing this result embodies a screw 52—A that may be adjusted to vary the size of the opening 52, to meet the required conditions and to accomplish the desired result.

It will therefore be seen that with this improved construction the liquid may be selectively directed into the measuring chamber on one or the other side of the diaphragm 14 or the measuring device may be completely cut off and the liquid shunted or by-passed from the inlet opening of the valve casing to the discharge outlet thereof.

The groove or channel 59 is so disposed with respect to the other ports or passages in the valve and in the valve casing that it will not interfere with the operation and positioning of these ports or passages, and will also be so arranged that it will be entirely cut off or disconnected from either the supply inlet or the discharge outlet of the valve casing when the other ports or passages are in position for use.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. A measuring device for liquids embodying a chamber, two compartments in the chamber out of communication with each other, a combined inlet and outlet for each compartment, a valve casing, ports in said casing with which the said inlets and outlets have communication, a supply port and a discharge outlet for said casing, a valve in the casing, ports and passages in the valve, certain of said ports and passages serving when the valve is rotated to cause the liquid to be delivered into one of the compartments from the supply, certain others of said passages permitting discharge of the liquid from the other of said compartments, means whereby the delivery of liquid into one of the compartments will cause a discharge of the liquid from the other compartment, and an additional passage in said valve operating when the supply and discharge outlet of the said compartments are cut off, to connect the supply inlet to the valve casing directly with the discharge outlet of the valve casing.

2. A measuring device for liquids embodying a chamber, two compartments therein out of communication with each other, means for directing a supply of liquid into and out of the respective compartments, means whereby the flow of liquid into one of the compartments will cause the discharge of the liquid out of the other compartment, means for selectively controlling the flow of the liquid with respect to the compartments, a discharge outlet through which the liquid is delivered as it flows from the respective compartments, and means for by passing the liquid with respect to the compartments and direct from the supply to said discharge outlet.

3. A measuring device for liquids embodying a chamber, two compartments therein out of communication with each other, means for directing a supply of liquid into and out of the respective compartments, a non-expansible diaphragm forming a dividing wall between said compartments, said diaphragm being of a diameter considerably greater than the diameter of the respective compartments and adapted to be moved into either of said compartments in close proximity to an opposing wall by pressure exerted thereagainst by liquid in the other compartment, means for selectively controlling the flow of liquid with respect to the compartments, a discharge outlet through which the liquid is delivered as it flows from the respective compartments, and means for by-passing the liquid with respect to the compartments and direct from the supply to said discharge outlet.

4. A measuring device for liquid comprising a chamber embodying two opposed hollow members provided with an open side and with their open sides in close proximity to each other, a flexible diaphragm disposed between the members and its peripheral edge secured between the proximate portions of the said members to form two compartments out of communication with each other, said diaphragm being of a diameter considerably greater than the internal diameter of the chamber, a combined inlet and outlet for each compartment, a source of supply of liquid and a discharge outlet, means for selectively and alternately connecting the source of supply and the discharge outlet with the said chambers, the said diaphragm being deflected by the liquid flowing into one of the compartments to discharge the liquid from the other of said compartments, and means for by passing the liquid from the source of supply and with respect to the said compartments, direct to said discharge outlet.

5. A valve embodying a casing having two pairs of spaced passages, each pair connected to a common port and each port constituting an inlet and an outlet with respect to said casing, there being a discharge outlet leading from the casing, there being a supply inlet leading to the casing, and a rotatable valve in the casing, there being ports and passages in the valve, adapted upon rotation of the valve, to be set to selectively connect the first recited ports with the said supply inlet and the discharge outlet.

6. A valve embodying a casing having two pairs of spaced passages, each pair connected to a common port and each port constituting an inlet and an outlet with respect to said casing, a rotatable valve in the casing, there being ports and passages in the valve, adapted upon rotation of the valve, to be set to selectively connect the first recited ports with the said supply inlet and the discharge outlet, and a by pass in the valve adapted to be positioned when the valve is rotated to close the first said passages, to form a direct communication between the supply inlet and the said discharge outlet.

7. A valve embodying a casing having two pairs of spaced passages, each pair connected to a common port and each port constituting an inlet and an outlet with respect to said casing, a rotatable valve in the casing, there being ports and passages in the valve, adapted upon rotation of the valve to be set to selectively connect the first recited ports with the said supply inlet and the discharge outlet, a by pass in the valve adapted to be positioned when the valve is rotated to close the first said passages, to form a direct communication between the said supply inlet and the discharge outlet, and means whereby when said by pass is rendered active, the pressure upon the liquid will be reduced.

8. A valve embodying a casing having two pairs of spaced passages, each pair connected to a common port and each port constituting an inlet and an outlet with respect to said casing, a rotatable valve in the casing, there being ports and passages in the valve, adapted upon rotation of the valve to be set to selectively connect the first recited ports with the said supply inlet and the discharge outlet, a by pass in the valve adapted to be positioned when the valve is rotated to close the first said passages, to form a direct communication between the said supply inlet and the discharge outlet, and means whereby when said by pass is rendered active, the pressure upon the liquid will be reduced, the said means embodying an adjustable member for restricting the inlet passage leading to said by pass.

9. A valve embodying a casing having two pairs of spaced passages, each pair connected to a common port and each port constituting an inlet and an outlet with respect to said casing, a rotatable valve in the casing, there being ports and passages in the valve, adapted upon rotation of the valve to be set to selectively connect the first recited ports with the said supply inlet and the discharge outlet, a by pass in the valve adapted to be positioned when the valve is rotated to close the first said passages, to form a direct communication between the said supply inlet and the discharge outlet, and means whereby when said by pass is rendered active, the pressure upon the liquid will be reduced, the said means embodying an adjustable member for restricting the inlet passage leading to said by pass, the said adjustable member extending into the valve casing and accessible from the outside of the casing.

VINCENT S. KUCKI.